United States Patent
Hofler

[11] Patent Number: 5,901,556
[45] Date of Patent: May 11, 1999

[54] HIGH-EFFICIENCY HEAT-DRIVEN ACOUSTIC COOLING ENGINE WITH NO MOVING PARTS

[75] Inventor: Thomas J. Hofler, Monterey, Calif.

[73] Assignee: The United States of America as represented by the Secretary of the Navy, Washington, D.C.

[21] Appl. No.: 08/979,371

[22] Filed: Nov. 26, 1997

[51] Int. Cl.⁶ .................................................. F25B 9/00
[52] U.S. Cl. ........................................ 62/6; 62/467
[58] Field of Search ..................... 62/6, 467; 60/516

[56] References Cited

U.S. PATENT DOCUMENTS

| | | | |
|---|---|---|---|
| 3,237,421 | 3/1966 | Gifford | 62/88 |
| 4,114,380 | 9/1978 | Ceperley | 60/721 |
| 4,355,517 | 10/1982 | Ceperley | 60/721 |
| 4,398,398 | 8/1983 | Wheatley et al. | 62/467 |
| 4,489,553 | 12/1984 | Wheatley et al. | 60/516 |
| 4,602,174 | 7/1986 | Redlich | 310/15 |
| 4,722,201 | 2/1988 | Hofler et al. | 62/467 |
| 4,858,441 | 8/1989 | Wheatley et al. | 62/6 |
| 4,953,366 | 9/1990 | Swift et al. | 62/467 |
| 5,165,243 | 11/1992 | Bennett | 62/6 |
| 5,303,555 | 4/1994 | Chrysler et al. | 62/6 |
| 5,647,216 | 7/1997 | Garrett | 62/6 |
| 5,813,234 | 9/1998 | Wighard | 62/6 |

*Primary Examiner*—Christopher B. Kilner
*Attorney, Agent, or Firm*—Donald E. Lincoln

[57] ABSTRACT

This invention describes a new geometry for a heat driven thermoacoustic prime mover (i.e. acoustic motor) and its application to a thermoacoustic refrigerator and to an electricity generator. The heat driven acoustic refrigerator has no moving parts, and is thus extremely reliable, simple, and cheap to manufacture. Unlike previous heat driven acoustic cooling engines, it has good efficiency and compactness and is easy to start, avoiding destructively high temperatures upon start-up. The cooling engine is saleable over an extremely wide range of cooling capacities from integrated circuit and sensor cooling to building air-conditioning. The electricity generating engine has modest efficiency, but may be attractive in remote applications where high-reliability or low cost or low environmental noise or solar powering is important. The generator is likely to be most attractive in capacities of a few kW to below 100 W where a tiny engine would be impractical using other technologies.

6 Claims, 9 Drawing Sheets

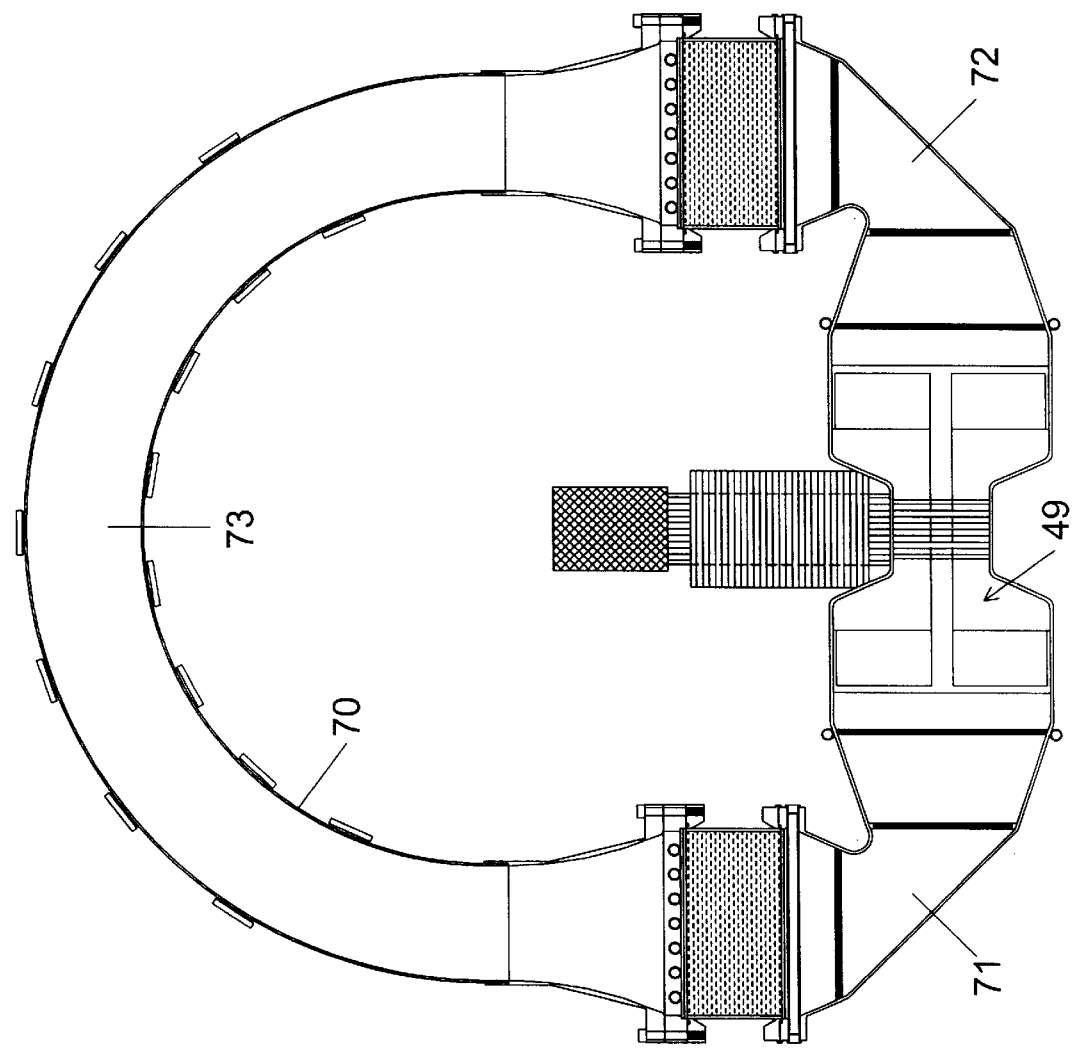

HIGH-EFFICIENCY HEAT-DRIVEN ACOUSTIC COOLING ENGINE WITH NO MOVING PARTS

BACKGROUND OF THE INVENTION

1. Field of the Invention

This invention relates to a heat driven thermoacoustic motor, or sound generator, powering either a thermoacoustic refrigerator or an electricity generator. Specifically, the invention consists of a geometry and other optional components that improve the efficiency, power density, and ease of start-up for a thermoacoustic motor. Applications include remote or recreational (e.g. camping) or solar power requirements for cooling or electricity; or for residential or commercial cooling where the cost of fossil fuel is much lower than the cost of electricity or peak electrical loads need to be reduced. The heat driven cooling engine invention can be scaled down to very small sizes for the purpose of cooling integrated circuits or sensors.

2. Description of the Related Art

While some features and advantages of this invention depend of convenient optimization and adjustment of thermoacoustic parameters, some of the advantage derives from capitalizing on the potential for additional Stirling cycle heat transport in addition to the primary thermoacoustic heat transport.

Both the Stirling cycle and the thermoacoustic cycle share many features and a common parameter space. Both utilize a primary thermodynamic fluid medium (usually a gas) that executes a reciprocating motion and an oscillatory pressure. The primary thermodynamic medium is in thermal contact with a secondary "recuperative" thermodynamic medium (usually a solid). The secondary solid medium has pores or channels that allows fluid flow with little resistance. The primary medium converts the work done by the pressure change of the primary medium into some combination of a temperature change or a heat flow to or from the secondary medium. The function of the secondary medium is to alternately sink and store heat on one half of the cycle and then source and release heat on the other half of the cycle. The heat storage capacity of the secondary medium is very much larger than that of the primary medium.

The differences between the Stirling cycle and the thermoacoustic cycle are as follows. In an unlimited thermally diffusive medium, heat can diffuse about one "thermal penetration depth" in distance in the time of one oscillatory cycle. The secondary medium in a Stirling engine is called a "regenerator" and has pores or channels that are very small relative to a thermal penetration depth, thus largely suppressing any temperature oscillation of the fluid. The primary "rule" for the Stirling cycle is that heat transport in the regenerator is equal in magnitude, and opposite in direction to the mechanical power flow (or acoustic power flow) in the fluid.

Thus a regenerator in a perfect standing wave (pressure and velocity phasing is in quadrature) can sustain a large temperature difference from end to end but will transport no heat, since there is no acoustic power flow. This was the original intent of the regenerator in the Gifford & Longsworth "Pulse Tube Refrigerator", U.S. Pat. No. 3,237,421 (March 1966). in reality, the power flow in this regenerator was not zero and a substantial amount of beneficial heat transport was achieved by both the pulse tube and the regenerator. In the orifice pulse tube refrigerator (Radebaugh, "A comparison of three types of pulse tube refrigerators: New methods of reaching 60K", Advances in Cryogenic Engineering, 31, 779 (1986)) the amount of mechanical power flow in the regenerator is increased by the dissipative orifice which increases the regenerator's heat transport.

The secondary medium of a thermoacoustic engine is called a "stack" and its pore or channel size is comparable to a thermal penetration depth, which allows the fluid temperature to oscillate, while allowing imperfect thermal contact between the two media. The stack transports heat in a perfect standing wave, where phasing between pressure and velocity are in quadrature, because of the time delays or phasing of the thermal diffusive wave in the stack's pores or channels. Creating the standing wave environment for the stack is trivial compared to the traveling energy wave required for the regenerator, thus achieving the mechanical simplicity of the typical thermoacoustic engine. The direction of heat flow in a refrigerating stack is always towards the nearby pressure antinode (PAN) of the standing wave (where the acoustic pressure distribution is at a maximum and the acoustic velocity is at a minimum or zero), and directed away from the PAN for a prime mover (motor).

However, the standing wave in a thermoacoustic engine is never perfect, and there is always acoustic energy flow through the stack. Because of this energy flow, there is always a Stirling component to the heat transport, in addition to the thermoacoustic transport. While the magnitude of the Stirling component may be small compared to the thermoacoustic component (perhaps 10%), it is either contributing to the performance of the engine (additive) or detracting (subtractive). So if the Stirling component of heat transport is managed properly in a thermoacoustic engine design, it will generally result in at least a 20% improvement in the efficiency, relative to an engine having a subtractive Stirling component.

In the original Wheatley thermoacoustic refrigerator, (Wheately, et al., "Acoustical heat pumping engine", U.S. Pat. No. 4,398,398 (Aug. 16, 1983)), the acoustic power source (the electromagnetic driver) is situated some distance from the cold end of the refrigerating stack. Thus acoustic power flows from the cold end of the stack to the warm end of the stack. The resulting Stirling component of heat transport is oriented from warm to cold and thus degrades the efficiency of the refrigerator.

In the second generation thermoacoustic refrigerator by Hofler, (Hofler et al., "Acoustic Cooling Engine", U.S. Pat. No. 4,722,201 (Feb. 2, 1988)), the acoustic power source (i.e. the driver) is situated at a PAN near the hot end of the refrigerator stack. The acoustic resonator is effectively ¼ of a wavelength, with large spherical volume at the end opposite the driver. The spherical volume approximates an open-end acoustic condition for the resonator. One reason for this invention was to prevent conduction or acoustic convection of heat from the warm driver to the cold end of the stack. However, this also orients the direction of the Stirling component of heat transport from the cold end of the stack to the warm end, thus improving the efficiency of the refrigerator.

In the heat driven thermoacoustic cooling engine by Wheatley et. al., "Heat-driven Acoustic Cooling Engine Having No Moving Parts", U.S. Pat. No. 4,858,441 (Aug. 22, 1989), the usual thermoacoustic prime mover is combined with the second generation thermoacoustic refrigerator, all combined in a ¼ wavelength portion of the standing wave (from PAN, to velocity antinode or VAN). This engine is shown schematically in FIG. A. While this engine is simple and has no moving parts, it has very poor efficiency, with a total COP in the range of 0.05 to 0.1 for a modest cooling temperature span. COP is an acronym for "coefficient-of-performance." Total COP is the cooling power divided by the heat input power, which can be much greater than unity for the combination of two Carnot cycle engines; a motor and refrigerator combination having perfect thermodynamic efficiency. There are two primary reasons why the efficiency is so low.

In FIG. A, the cooler stack pumps heat Q upward, while the acoustic power W comes from the prime mover stack above it, creating a downward acoustic power flow. Thus the Stirling component of heat transport is directed upward enhancing the efficiency of the cooler stack. However, heat flows downward through the prime mover stack from hot to ambient temperature and the Stirling component of acoustic power flow is thus directed upward in opposition to the thermoacoustic component of mechanical power provided to the cooler stack. This substantially degrades the efficiency of the prime mover stack.

The second disadvantage of the old design is that the prime mover and cooler stacks must fit into mutually exclusive regions of the standing wave. Typically, for small temperature span thermoacoustic engines, the stack performs best when it occupies a region in the standing wave extending from 0.08 to 0.2 radians, measured from the pressure antinode (PAN). This is more or less true for both prime mover stacks and for cooler stacks. Hence, in the original design of Wheatley U.S. Pat. No. '441, the prime mover stack is too close to the PAN and the cooler stack is too far from the PAN for optimal performance.

While the two stacks in FIG. A could have different diameters, this would be difficult to accomplish without increasing the undesirable distance between the stacks. Also, it would not have the desired effect of altering the power balance between the two stacks. Increasing the diameter of one stack would increase the cross-sectional area of the stack but would decrease the acoustic velocity. The two effects would roughly cancel, leaving the power capacity of the stack unchanged.

Another heat driven cooler invention is the thermoacoustically driven orifice pulse tube refrigerator, patented by Swift et al, "Acoustic Cryocooler", U.S. Pat. No. 4,953,366 (Sep. 4, 1990). This is an effective and moderately efficient cryocooler engine having no moving parts. However, the orifice pulse tube refrigerator is only efficient in the cryogenic temperature regime and is inherently inefficient for small temperature spans. The orifice pulse tube refrigerator is essentially a Stirling engine variant where the cold temperature cooling power is comparable in magnitude to the mechanical power dissipated as heat in the orifice. For cryogenic coolers where even the Carnot COP is very small, the energy wasted by the orifice is almost negligible and less important than other factors. For a small temperature span refrigerator, such as an air conditioner, the orifice pulse tube refrigerator, by itself, would have a COP less than unity. And a heat driven version would have a total COP very much less than unity. This is a prohibitively poor efficiency.

The heat driven cooler topology disclosed in this invention allows independent positioning of the two engine stacks with respect to the standing wave, and also aligns the acoustic power flow and the heat flow to be anti-parallel in both stacks for best efficiency. The topology also allows the power capacity (heat power or acoustic power as the case may be) of each stack to be independently adjusted by changing the diameter of each stack. This is advantageous for efficiency optimization in general, and for ensuring easy engine start-up with a modest hot temperature.

SUMMARY OF THE INVENTION

The object of the proposed invention is to create a powerful heat driven acoustic power source (engine) with higher efficiency.

Another object of the invention is to create a heat driven thermoacoustic power source (engine) coupled to a thermoacoustic refrigerator with no moving parts and higher efficiency. The engine cools over a modest temperature span suitable for commercial and air conditioning purposes. It could be implemented in a wide range of sizes from tiny to large building air conditioners. Such an engine is compact, economical, and has excellent reliability. Also, the invention can have a total COP in the range of 0.5 to 1.0, which is competitive with the efficiency of conventional chemical absorption coolers.

Still another object of this invention is provide an easy or convenient means of starting the engine, without excessively high hot temperatures or additional moving parts.

Yet another object of this invention is to provide alternate engine topologies that trade off economy of construction for improvements in both compactness and efficiency.

The final objective of this invention is create a heat driven electric generator by coupling the improved heat driven acoustic power source to a reciprocating piston electric generator.

In one embodiment of the invention an acoustic power source is created with a thermoacoustic stack coupled to a high temperature heat source heat exchanger and to an ambient heat sink heat exchanger in an acoustic resonator that is effectively one half of a wavelength long. Such a resonator has low impedance terminations at each end, such as large spherical volumes. The hot heat exchanger and hot end of the stack is situated closest to the nearby PAN in the standing wave. In this embodiment the PAN is approximately in the middle of the resonator and is not created by the usual rigid termination or end cap. Thus the acoustic power generated by the stack flows from the hot end of the stack through the PAN. In the stack, the acoustic power flow and heat flow are aligned anti-parallel, which means that the thermoacoustic stack can perform more like a Stirling engine regenerator with improved efficiency.

The acoustic power flows from the hot heat exchanger and through the PAN to another device such as the thermoacoustic refrigerator assembly or electric generator assembly. The second assembly will be at ambient temperature and thus there will be a heat leak from the hot exchanger to the ambient assembly, which may degrade the efficiency of the acoustic power source. Such heat leaks are usually exacerbated by acoustically stimulated convection. This heat leak or source of inefficiency should not be as severe as it might seem, because the velocity of acoustically stimulated convection tends towards zero at a PAN.

In order to minimize the above heat leak, the invention provides for two thin porous disks to be placed inside the resonator; one on either side of the PAN. Each disk covers the bore of the vessel and is located very near the PAN, on opposite sides. The object of the disks is to impede or stagnate the convective flow and concomitant heat flow, without dissipating a significant amount of acoustic power. The spacing between disks should be just large enough to prevent thermoacoustic heat transport between the disks. The flow impedance of the disks should be high enough to impede the convective flow, yet low enough to avoid impeding the acoustic velocity. Selecting the desired disk flow impedance is not difficult since the acoustic impedance as this point in the standing wave is extremely high, and the hydrodynamic forces driving the convection are quite small.

In a further development of the embodiment, a thermoacoustic refrigerator assembly, including an ambient heat exchanger, and refrigerating stack, and a cold heat sink heat exchanger is also contained in the acoustic resonator. The refrigerator assembly's location is near the PAN on the side opposite that of the acoustic power source. This arrangement of refrigerator components is the same as the invention of Hofler U.S. Pat. No. '201, with the exception of the acoustic driver. In this embodiment, the acoustic power flow and heat flow are also aligned anti-parallel, allowing the stack to perform more like a Stirling regenerator, and thereby improving the efficiency.

The length of the two stacks and their location relative to the PAN can be modified or optimized independently. Furthermore, the diameter of the resonator vessel can be different on either side of the PAN, as is the diameter of each of the two engine assemblies. If the transition between the two diameters is located at the PAN, then the acoustic power capacity in each of the two engine assemblies can be independently modified or optimized via the diameter.

In another modification of the heat driven refrigerator embodiment, two effectively half wavelength units are combined into one full wavelength unit having a toroidal topology, eliminating the bulky spherical volumes. This engine has two driver stacks and two refrigerator stacks, for a total of four stacks. The object is to reduce resonator dissipation and improve efficiency and to improve the compactness of the engine. The fabrication cost would be substantially higher since nearly twice the number of components are required.

In yet another modification of the heat driven refrigerator embodiment, the spherical volumes providing the low impedance acoustic terminations, are replaced by a pressure vessel envelope covering the entire engine. The envelope would provide a more compact folded version of the large end volumes and also help provide added insulation for the hot and cold temperatures of the engine. Thus, both compactness and efficiency could be improved, with little additional fabrication cost.

In the electrical generator embodiment, the acoustic power from the heat driven source is used to drive a reciprocating piston directly coupled to a linear generator. The piston assembly is internal to the resonator vessel and has a magnetic component. The magnetic component of the piston completes the magnetic circuit of a transformer core that is external to the resonator vessel. The external magnetic core assembly also has a fixed electrical coil. In one embodiment, a permanent magnet is incorporated into the external magnetic circuit and the oscillating internal magnetic component is fabricated from a high permeability material. As the internal magnetic component moves, the reluctance of the magnetic circuit varies. This type of generator is commonly called a "variable reluctance generator." In another embodiment, the oscillating internal magnetic component is a permanent magnet. Such a generator is referred to as a "moving magnet" generator and might be similar to the invention of Redlich, "Electromechanical Transducer Particularly Suitable For A Linear Alternator Driven by a Free-Piston Stirling Engine", U.S. Pat. No. 4,602,174 (Jul. 22, 1986).

While the efficiency of such an electric generator is probably not competitive with large systems based on gas or steam turbines, it is competitive with systems based on inexpensive internal combustion engines. The utility of this generator embodiment would be best in the following areas: For small capacity and size, low fabrication cost, high reliability, low environmental (audible) noise output, and utilization of solar power.

BRIEF DESCRIPTION OF THE DRAWINGS

FIG. 9 illustrates a heat driven electricity generator having two driver stacks and a single generator with one moving part.

Glossary

Figure 1:
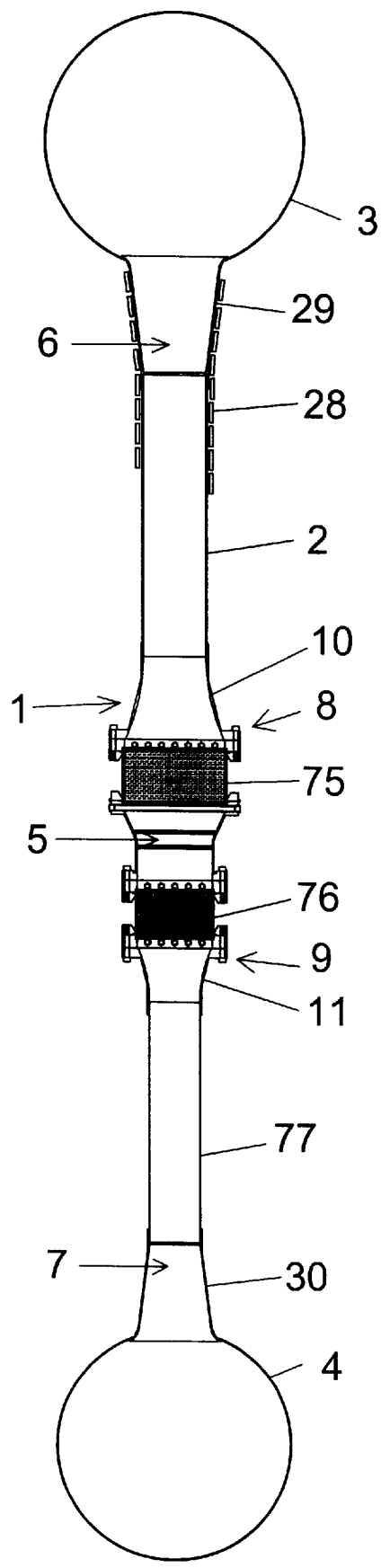
FIG. 1 illustrates a sectional view of a heat driven refrigerator having no moving parts. A single driver stack and a single refrigerator stack are incorporated in an effectively half wavelength resonator.

The following list of elements are referred to in the drawings representing "A High-Efficiency Heat-Driven Acoustic Cooling Engine With No Moving Parts."

1. Resonator and Pressure Vessel
2. Driver Cylindrical Tube
3. Driver Large Spherical Volume
4. Refrigerator Large Spherical Volume
5. PAN (Pressure Antinode)
6. VAN (Velocity Antinode)
7. VAN (Velocity Antinode)
8. ThermoAcoustic Driver or Motor Assembly
9. ThermoAcoustic Refrigerator Assembly
10. Driver Tube Reducer
11. Refrigerator Tube Reducer
12. Driver ThermoAcoustic Stack
13. Refrigerator ThermoAcoustic Stack
14. Driver Ambient Temperature Fine Finned Component
15. Driver's Hot Heat Source Fine Finned Component
16. Refrigerator Ambient Temperature Fine Finned Component
17. Refrigerator Cold Heat Source Fine Finned Component 18. Driver Ambient Temperature Radial Ribs
19. Driver Hot Heat Source Radial Ribs
20. Refrigerator Ambient Temperature Radial Ribs
21. Refrigerator Cold Heat Source Radial Ribs
22. Driver Ambient Temperature Fluid Carrying Heat Sink Tubes
23. Refrigerator Ambient Temperature Fluid Carrying Heat Sink Tubes
24. Refrigerator Cold Heat Source Fluid Carrying Tubes
25. Driver Hot Heat Source Heater Cartridge Fluid Carrying Heat Sink Tubes
26. Driver Side Thin Porous Disk
27. Refrigerator Side Thin Porous Disk
28. Electrical Heater Tape
29. Driver Tapered Tube Reducer (diffuser)
30. Refrigerator Tapered Tube Reducer (diffuser)
31. Driver Assembly
32. Driver Assembly
33. Refrigerator Assembly
34. Refrigerator Assembly
35. Toroidal Resonator
36. PAN
37. PAN
38. VAN
39. VAN
40. Large Elongated Volume
41. Large Elongated Volume
42. Internal Plate
43. Hemisphere
44. Internal Plate
45. Volume
46. Main Internal Resonator Tube
47. External Pressure Vessel.
48.
49. Linear Oscillating Piston Assembly
50. Large Diameter Low-Mass Piston
51. Large Diameter Low-Mass Piston
52. Piston Connecting Rod
53. Cylinder Plug
54. Magnetic Core
55. Permanent Magnet
56. Conducting Coil
57. Conducting Coil
58. Cooling Tube
59. Thermally Conductive Porous Disk
60 Volume
61. Cylinder
62.
63.
64.
65.
66.
67.
68.
69.
70. Resonator Vessel
71. PAN
72. PAN
73. VAN
74.
75. Driver Stack Tube
76. Refrigerator Stack Tube
77. Refrigerator Cylindrical Tube
78.
79.
80. Focused Solar Radiation Heat Source
81. Transparent Windows (2)
82. Connecting Tube between the acoustic power driver to the refrigerator
83. Hot Face of the Driver Stack

DETAILED DESCRIPTION OF THE INVENTION

Referring to FIG. 1, this embodiment of a thermoacoustically driven thermoacoustic refrigerator consists of two stack and heat exchanger assemblies contained in an acoustic resonator, that is effectively one half wavelength long, and contains pressurized inert gas. FIG. 1 depicts a functional experimental apparatus. The resonator and pressure vessel 1 consists of a driver cylindrical tube 2, having a diameter smaller than the driver stack tube 75, and terminated by a driver large spherical volume 3; as well as refrigerator cylindrical tube 77, having a diameter smaller than refrigerator stack tube 76, and terminated by refrigerator large spherical volume 4. The standing wave generated inside the resonator vessel is effectively one half of one wavelength, with the PAN (Pressure Antinode) located at position 5 and the two VAN's (Velocity Antinode's) located at positions 6 and 7. There are two stack and heat exchanger assemblies; the thermoacoustic driver assembly 8, and the thermoacoustic refrigerator assembly 9, which are discussed in more detail below.

The reasons for the diameter changes in the driver cylindrical tube portion 2 of the vessel are summarized as follows: The diameter of the driver stack tube 75 is reduced by the driver tube reducer 10 typically by a factor of 1.5 to 2. This diameter change achieves two benefits compared to a constant diameter tube. First, the length of the resonator is reduced, for a given operating frequency, making the device more compact. Second, the acoustic power dissipated at the internal walls of the tube is greatly reduced. The dissipation is reduced partially because the length is reduced. More detail is given in Hofler U.S. Pat. No. '201. The refrigerator tube reducer 11 coupled to the refrigerator stack assembly 76 serves the same function also. The shape of reducers 10 and 11 should have a gradual and smooth diameter change so as to avoid flow separation caused by relatively high acoustic velocities.

Typically, the diameter changes discussed in the previous paragraph are adjusted so as to minimize acoustic dissipation in the resonator and maximize the overall efficiency of the engine. A third possible benefit is that the diameters can be adjusted so as to minimize engine vibration and noise. The diameter ratio of tube 2 to tube 75 can be made significantly different than the tube 77 to tube 76 diameter ratio. Resonator dissipation may be increased slightly, adversely impacting engine efficiency. But the net oscillatory gas momentum in tube 2 or tube 77 is very diameter dependent. If the diameter of tube 2 is made smaller, the gas momentum is reduced and the gas momentum can be made equal in magnitude, and opposite in direction, to that of tube 77. By this means the gas momentum of the entire engine can be made to cancel, thereby reducing engine vibration and audible noise.

The tube reducer at location 5 serves a different function. The object is to scale the overall power capacity of each of the two stack assemblies via their diameter. The independence of relative power capacity thus achieved is useful for purposes of efficiency optimization and/or improving the ease of engine start-up or limiting the hot temperature. Since the diameter changes rather abruptly at a point where the acoustic velocity is very low and largely resistive in phase (i.e. the acoustic velocity here is transferring acoustic power and is not involved in the reactive oscillatory energy) the reactive acoustic velocity elsewhere in the resonator is not affected by this diameter change. This means that the relative acoustic velocity or pressure in the two stack assemblies is dependent primarily on the distance from the PAN and nothing else. Thus the power capacity of each stack assembly will scale with diameter. Conversely, if the diameter change were to be made a location where the acoustic velocity is predominantly reactive, such as between the two stacks in FIG. A from patent '441, then there would be a large change in acoustic velocity that would negate the desired power capacity change. Finally, flow separation is unlikely at location 5 because of the low acoustic velocity.

The tapered tube reducers 29 and 30 make the transitions to the spherical volumes 3 and 4. Since the acoustic velocity is very high at these transitions, flow separation and associated acoustic dissipation is likely. Tapered reducers 29 and 30 are sometimes called "diffusers" and their function is to slow down the acoustic velocity at the junction to the spherical volumes and reduce the severity of the flow separation and amount of acoustic dissipation.

Figure 2:
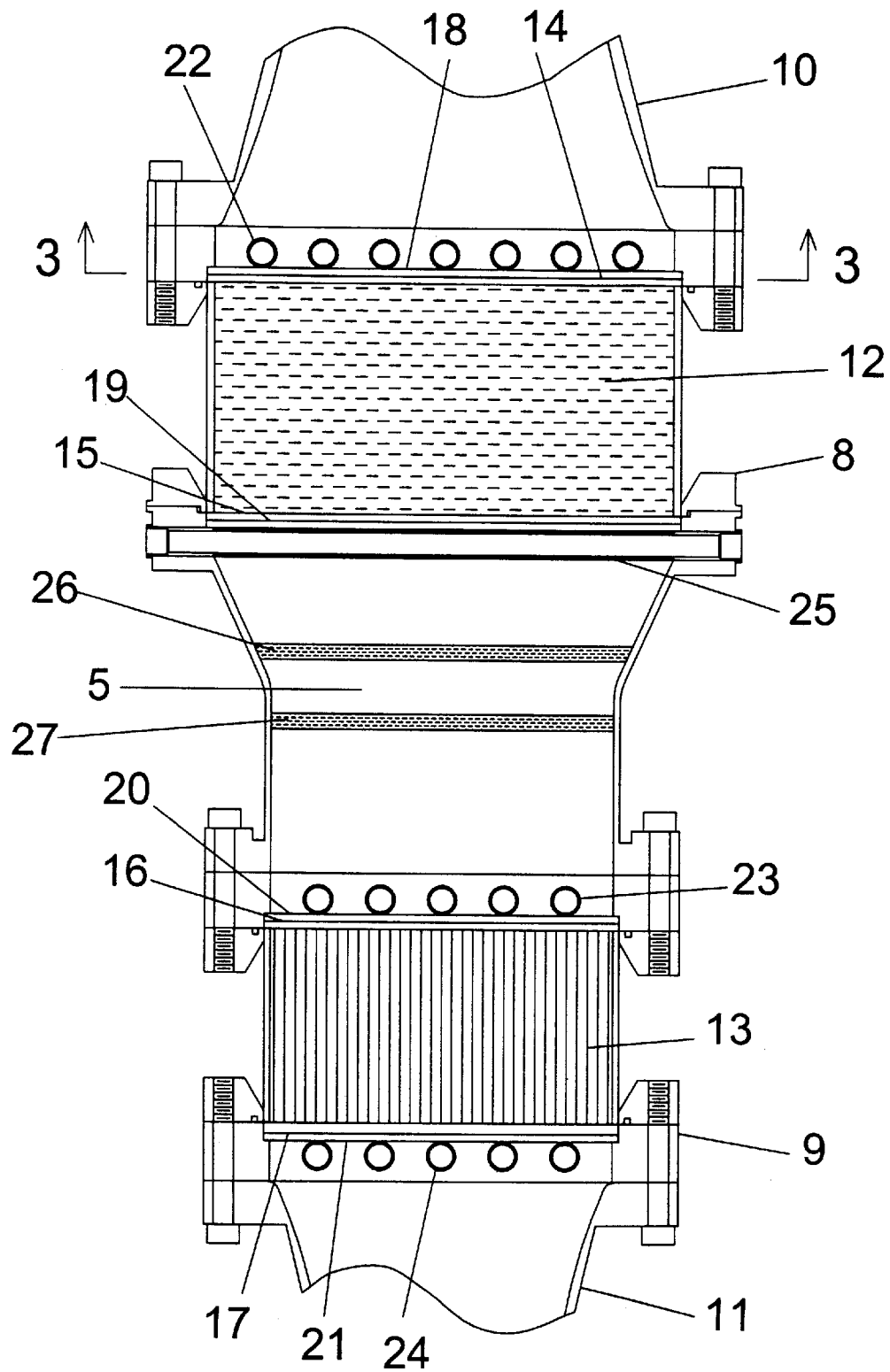
FIG. 2 shows an enlarged sectional view of the central portion of FIG. 1 containing both stack and heat exchanger assemblies.

To discuss the stack and heat exchanger assemblies of FIG. 1, we now refer to the enlarged view of the central portion of this engine shown in FIG. 2. The driver and refrigerator assemblies 8 and 9 are comprised of driver thermoacoustic stack 12 and refrigerator thermoacoustic stack 13 and two heat exchangers for each stack, one adjacent to each end of the stack.

The driver thermoacoustic stack 12 consists of many wire mesh disks stacked up to make a porous cylindrical plug. The wire is typically stainless steel. The point contacts between wires of two adjacent mesh disks greatly reduces the conductive heat flow down the temperature gradient in the stack. This is the same arrangement as in a typical Stirling engine regenerator, except that the spacing between wires in a disk is about a factor of 10 larger than for a regenerator, so that the thermodynamic processes in the stack are thermoacoustic and not isothermal, as in a Stirling cycle. The stack could also be fabricated from a spiral roll of stainless steel foil with gaps between adjacent layers. The gaps would be oriented parallel to the acoustic flow. The steel foil would have a substantially large amount of thermal conduction heat flow reducing the driver's efficiency.

The refrigerator thermoacoustic stack 13 is fabricated from a spiral roll of plastic film with gaps between adjacent layers, as in patent '201. The plastic film has low thermal conductivity compared to stainless steel. This stack could also be fabricated in the same manner as the driver stack 12.

Figure 3:
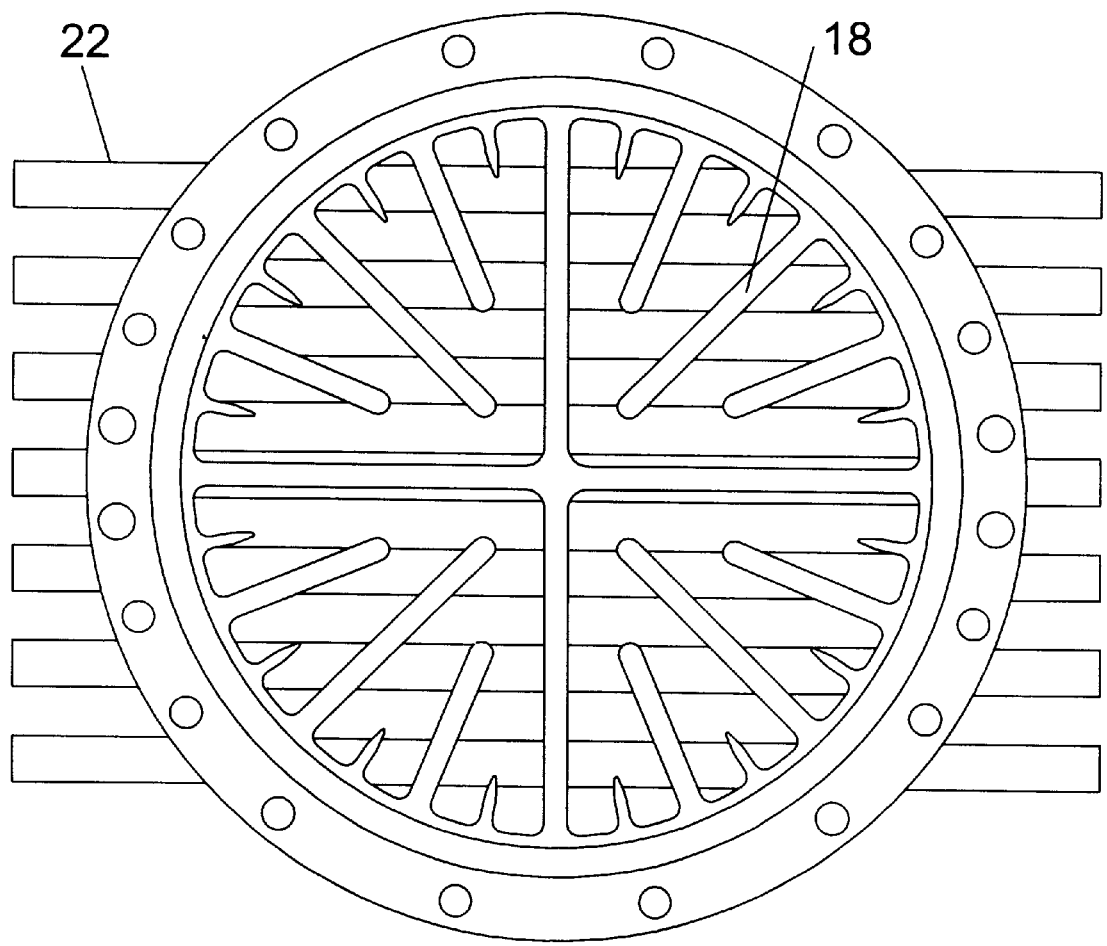
FIG. 3 is a bottom plan view of the ambient driver heat exchanger taken at section A-A' in FIG. 2. The cooling tubes and radial ribs are shown mounted in a flange.

At each end of both stacks are heat exchangers. A fine scale metal finned structure is located immediately adjacent to each stack end. The fins are made by pairing a copper or nickel ribbon with an aluminum ribbon and winding the pair in a spiral with adhesive, thereby forming a pancake disk. The disk is mounted and a heavy layer of copper or nickel is electroplated on one face of the disk. The plated layer is milled exposing the ribbon except for radial ribs bonded to the ribbon edges. The aluminum ribbon is dissolved with acid which opens the gaps between the layers of ribbon which is held in place by the radial ribs. In FIG. 2 the fine finned components are items 14, 15, 16, and 17. The radial ribs holding the fins in alignment are items 18, 19, 20, and 21. A plan view of one heat exchanger is shown in FIG. 3 with 32 radial ribs 18. The fine scale fins are not shown in FIG. 3, but would cover the top of ribs 18.

The spacing between adjacent heat exchanger fins is typically ½ to ¾ the size of the gaps or pores in stacks 12 and 13. The smaller spacing allows the height of the fins (i.e. width of ribbon) to be very short, while maintaining good thermal contact with the gas. Reducing the finned surface area improves engine efficiency. Given the high heat power density of the engine and the small volume of fin material, it is very easy to thermally overload the heat conductance of the fins. For this reason, materials that are more exotic than copper may be desirable. Ribbon made of highly-oriented-pyrolytic-graphite can have a thermal conductivity 2 or 3 times that of copper. For applications requiring very small engines, deposition of synthetic diamond or sapphire on a metal ribbon substrate would produce enhanced thermal conductance.

In FIG. 3, the group of 32 radial ribs 18 are soldered or brazed onto the group of 7 tubes 22 that are the heat source or sink to regions external to the resonator vessel. These tubes can carry pumped water or anti-freeze, or they can be part of a heat pipe or thermal siphon (a gravity assisted heat pipe). They can also have electrical heater cartridges inserted into them as a heat source, or they could carry air/fuel combustion gases as a heat source. In FIG. 2 the fluid carrying tubes are groups 22, 23, and 24; and the tubes 25 have heater cartridges inserted into them. Tube group 22 is also shown in FIG. 3. The tubes in each fluid carrying group are oriented parallel to one another and are coupled to external inlet and outlet manifolds (not shown). Typically, the flow resistances of the tubes are plumbed in parallel by the manifolds. The heater cartridge tubes in group 25 are oriented radially, and are co-aligned with the plated radial ribs.

These four heat exchanger units are organized thermally as follows: Note that the term heat sink or source is in reference to the internal heat loading of the stack, not the external loading. Items 14, 18, and 22 are the driver's ambient temperature heat sink. Items 15, 19, and 25 are the driver's hot (typically 400° C.) heat source. Items 16, 20, and 23 are the refrigerator's ambient temperature (typically 35° C.) heat sink. And items 17, 21, and 24 are the refrigerator's cold (typically −5° C.) heat source.

Heat can be carried convectively from the hot exchanger components 15, 19, and 25 to the refrigerator's ambient exchanger components 16, 20, and 23. Thin porous disks 26 and 27 help prevent this convective heat transport without dissipating any significant amount of acoustic energy. The disks also help reduce radiative heat transfer from the hot exchanger components. The location of the two disks is very near, and on either side of, the PAN. Since disks 26 and 27 will be moderately hot, they are typically comprised of one or a few sheets of stainless steel wire mesh. The wire size and spacing is roughly half that of the material used in either of the stacks 12 or 13. Since the driving impedance for the convective steady flow is very low, and the driving impedance for the acoustic flow is very high at this location, the flow impedance of the disks should be moderately high.

The position of the PAN 5, relative to the two stacks is very critical for achieving the desired thermoacoustic performance from the engine. If the PAN is too close to the driver stack, the engine will not oscillate. If the PAN is too far from the driver stack, the efficiency will be poor. For this reason, it is desirable to dynamically adjust the position of the PAN while the engine is operating, by some means. However, another even more important reason exists for dynamically adjusting the PAN position.

Getting the engine started is usually difficult. Prior to start-up, the cooler stack has no temperature gradient and is at ambient temperature. In this state, the potential acoustic load represented by the cooler stack is much larger than when it is cold. ("Potential" refers to acoustic behavior prior to the existence of the wave.) If the cooler's potential acoustic power load is larger than the potential power output of the driver, the engine will not start. Once the engine has been running and the cooler stack is cold, its relative power load is much reduced. One solution is to greatly increase the driver's hot heat exchanger temperature for start-up conditions. This is undesirable because of possible melt-down problems or the requirement for expensive ultra-high temperature materials. A better solution is to shift the position of the PAN away from the driver stack. The downward shift of the PAN in FIG. 1 will make the driver stack generate more potential acoustic power and the cooler stack potentially dissipate less power and cause the acoustic oscillations to start.

A very simple means of adjusting the position of the PAN is an electrical heater tape 28 wound around a portion of the resonator vessel on the driver side, where the acoustic velocity is high. Any controllable heat source could be used instead of an electrical heater. By increasing the temperature of the tube in this region, the location of the PAN is shifted downward in FIG. 1. A small amount electricity or heat is wasted, but no moving parts are added.

Figure 4:
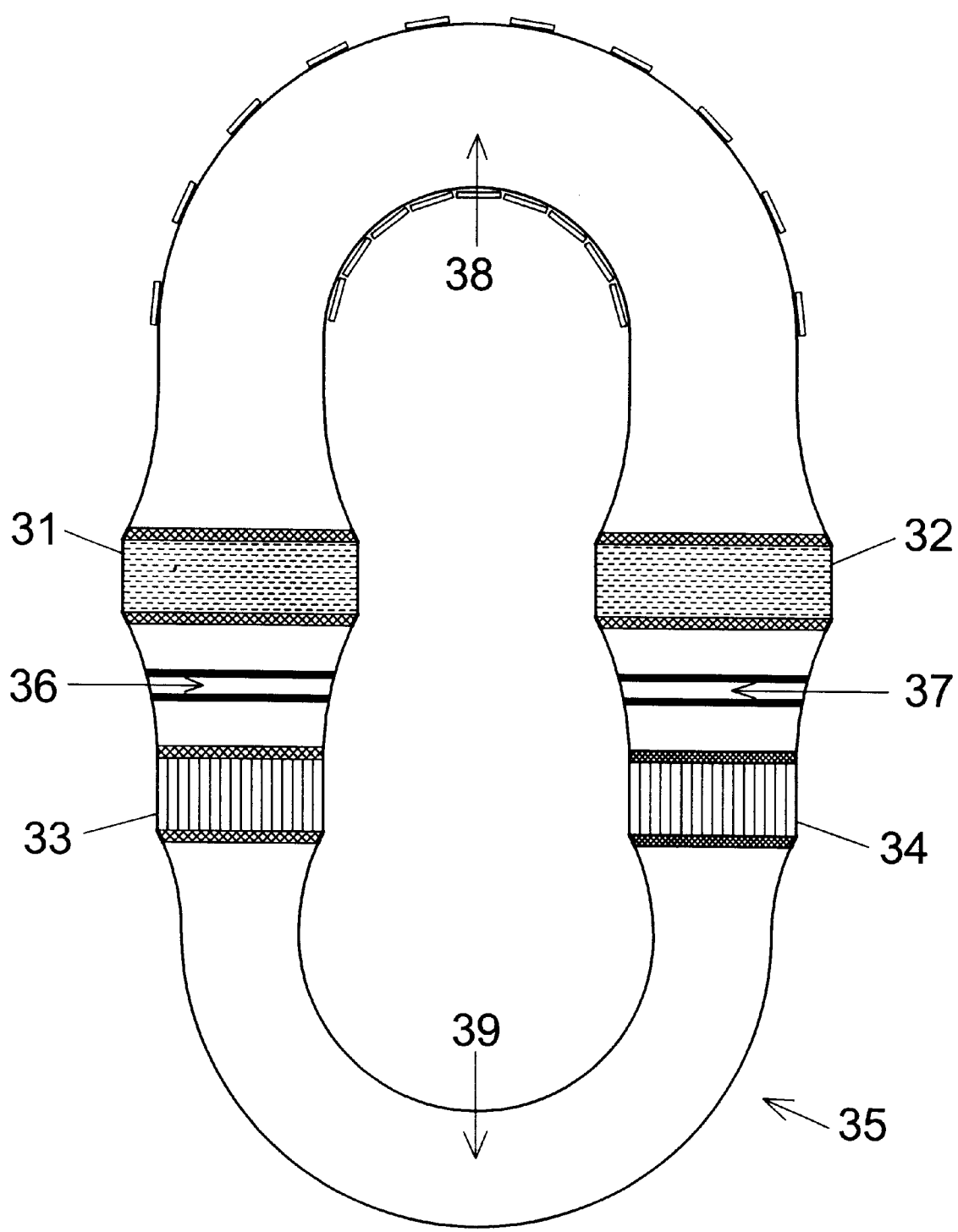
FIG. 4 illustrates a sectional view of a heat driven refrigerator housed in a toroidal resonator that is effectively one wavelength in circumference and containing two driver stacks and two refrigerator stacks.

Other acoustical geometries and packaging schemes can be used to make the cooling engine more efficient and/or more compact. FIG. 4 is a schematic drawing of a heat driven cooling engine having two driver assemblies 31 and 32 and two refrigerator assemblies 33 and 34 in a toroidal resonator 35 that has an acoustic path length of exactly one acoustic wavelength. A driver/cooler pair of assemblies such as 31 and 33 is identical to the configuration shown in FIG. 2, in both appearance and function. The standing wave is oriented in the resonator so that two PAN's exist at positions 36 and 37, and two VAN's exist at positions 38 and 39.

The advantage of this embodiment is that the engine is more compact because the bulky spherical volumes have been eliminated and because of the folded shape of the two U-tubes. Also, the resonator dissipates less acoustic energy, improving the engine efficiency. Residential air conditioning units having multi-ton cooling capacities can be built utilizing this embodiment, and result in a unit size that is almost as small as traditional vapor-compression machines. The disadvantage of this embodiment is that fabrication costs are increased because double the number of stack and heat exchanger components are required.

Figure 5:
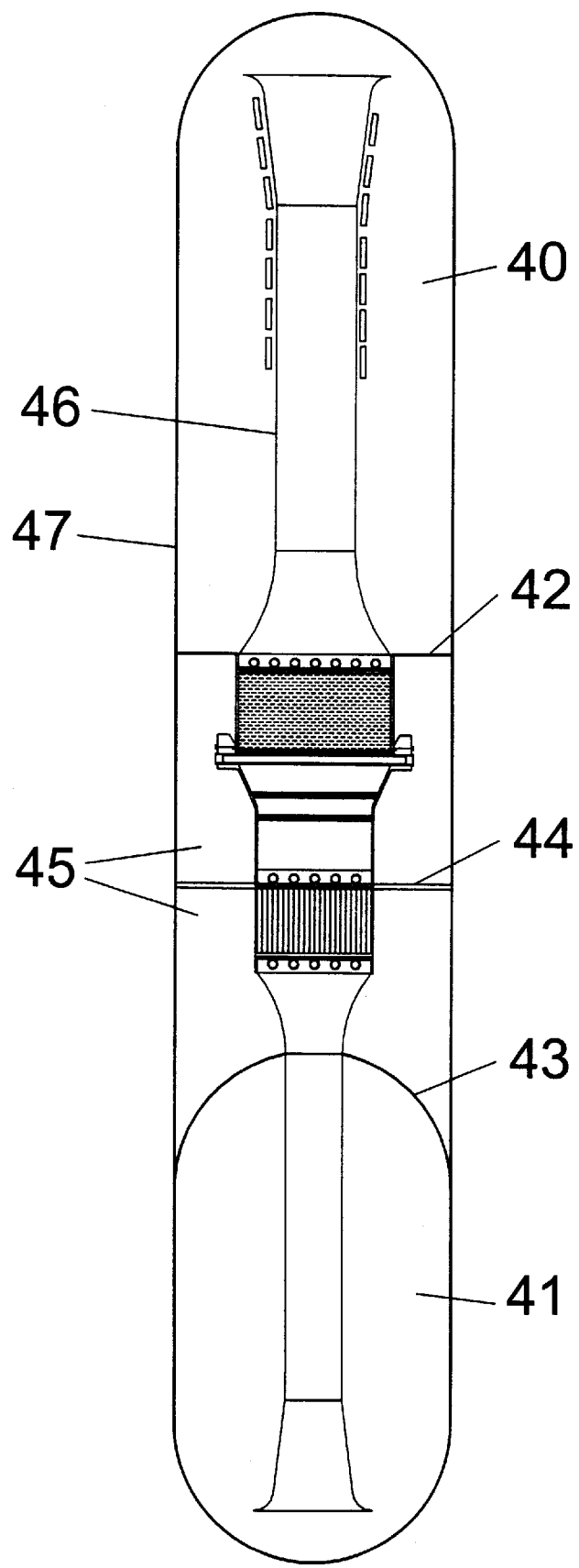
FIG. 5 illustrates a sectional view of a heat driven refrigerator similar to that of FIG. 1, but with a folded coaxial resonator geometry that is more compact, and provides for hotter drive temperatures and better thermal insulation.

Yet another embodiment is shown in FIG. 5. This variation replaces the large spherical volumes 3 and 4 of FIG. 1 with large elongated volumes 40 and 41. The "folding" achieved by making the main resonator tube 46 reentrant with volumes 40 and 41, in combination with their elongated shape, makes the engine considerably more compact. Internal plate 42 and hemisphere 43 form a gas tight seal separating volumes 40 and 41 from volume 45.

While volumes 40 and 41 are acoustically active volumes, volume 45 is not. Volume 45 contains a pressurized inert gas with good thermal insulating properties and is packed with fibrous insulating material. While the acoustically active resonator typically contains helium gas or helium mixtures having high thermal conductivity, the insulating gas in volume 45 is typically argon or krypton at approximately the same pressure as the helium. The presence of pressurized volume 45 provides continuity of the whole external pressure vessel 47. While vessel 47 must be strong enough to contain the gas pressure, internal resonator tube 46 can be made with thin walls, even where the high temperatures exist. Not only does the insulating gas of volume 45 provide direct insulating value, but the thin internal construction further reduces thermal conduction between the heat exchangers. Also, the inert insulating gas in volume 45 helps prevent oxidation of hot internal heat exchanger components. Finally, vessel 47 is near ambient temperature over its entirety, so its strength is not compromised by the hot heat exchanger temperature.

Internal plate 44 separates volume 45 into two portions. Plate 44 prevents gross gas flow between the two portions while allowing a slight leakage between portions for pressure equalization. The function of plate 44 is to further improve the quality of thermal insulation around the cold portion of the refrigerator, especially with respect to the hot heat exchanger of the driver.

Figure 6:
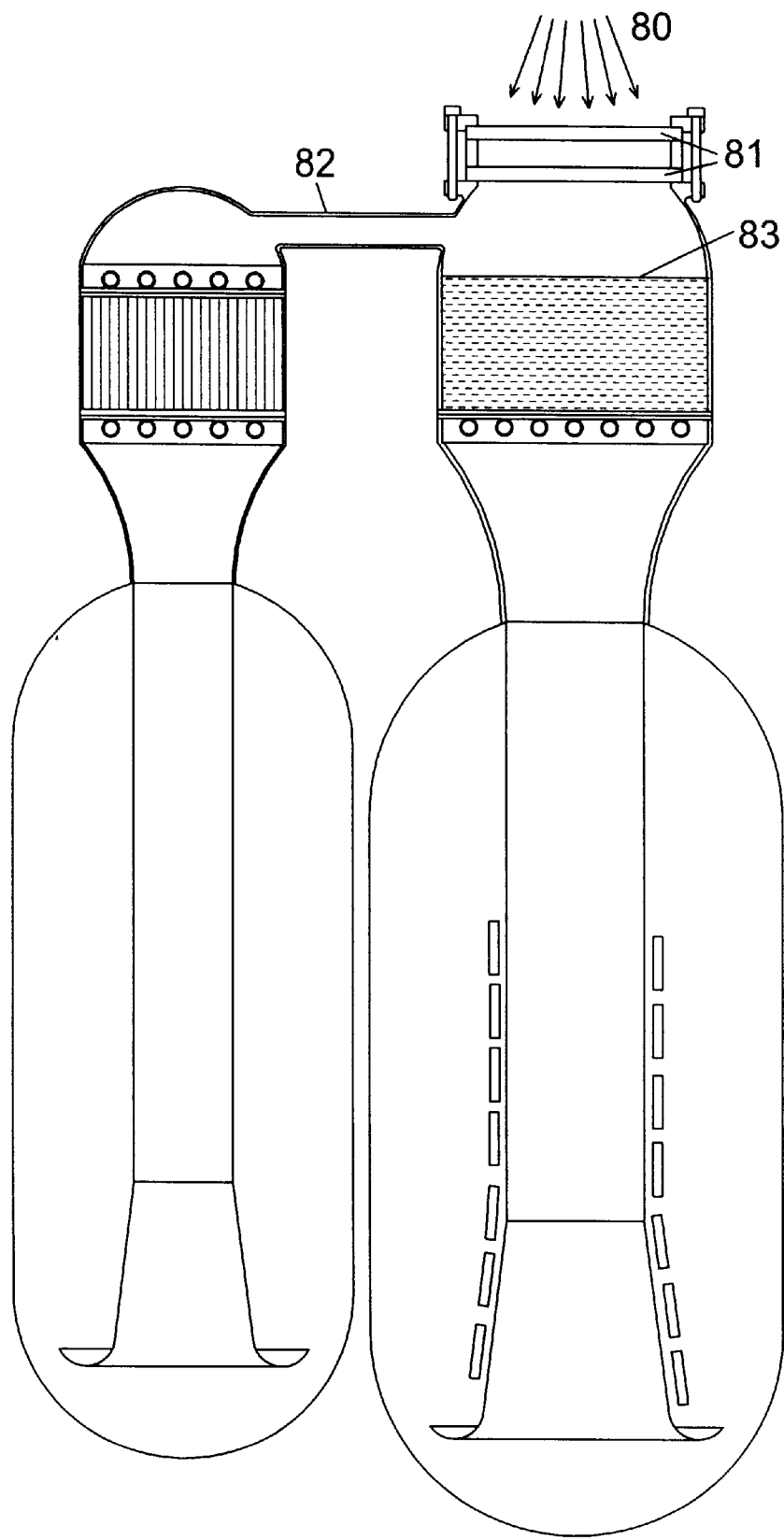
FIG. 6 is a sectional view of a modified version of the engine shown in FIG. 5. The resonator is folded yet again in the middle, so that the driver and refrigerators portions of the engine are side-by-side. The hot face of the driver stack is more readily exposed to a focused solar radiation heat source.

The engine shown in FIG. 5 can be folded yet again in the middle at the PAN, where the acoustic velocity is small, as shown in FIG. 6. In addition to further improving the compactness of the engine, this modification exposes the hot face of the driver stack 83 to a focused solar radiation 80 heat source. The focused sunlight 80 passes through two transparent windows 81 into the pressurized acoustic space and impinges on the stack face 83. Note that no heat exchanger fins are required at face 83. If the stack material is sufficiently optically opaque and absorptive, the light is directly converted to heat where the heat is required. Transparent windows 81 can be made from a high temperature material such as fused quartz. The inner hot window has an equalized mean pressure on both sides to prevent creep flow of the window. The cooler outer window is insulated by the inner window and sustains the force of the internal mean pressure. Connecting tube 82 couples the acoustic power generated by the driver to the refrigerator. The PAN is located in tube 82.

Figure 7:
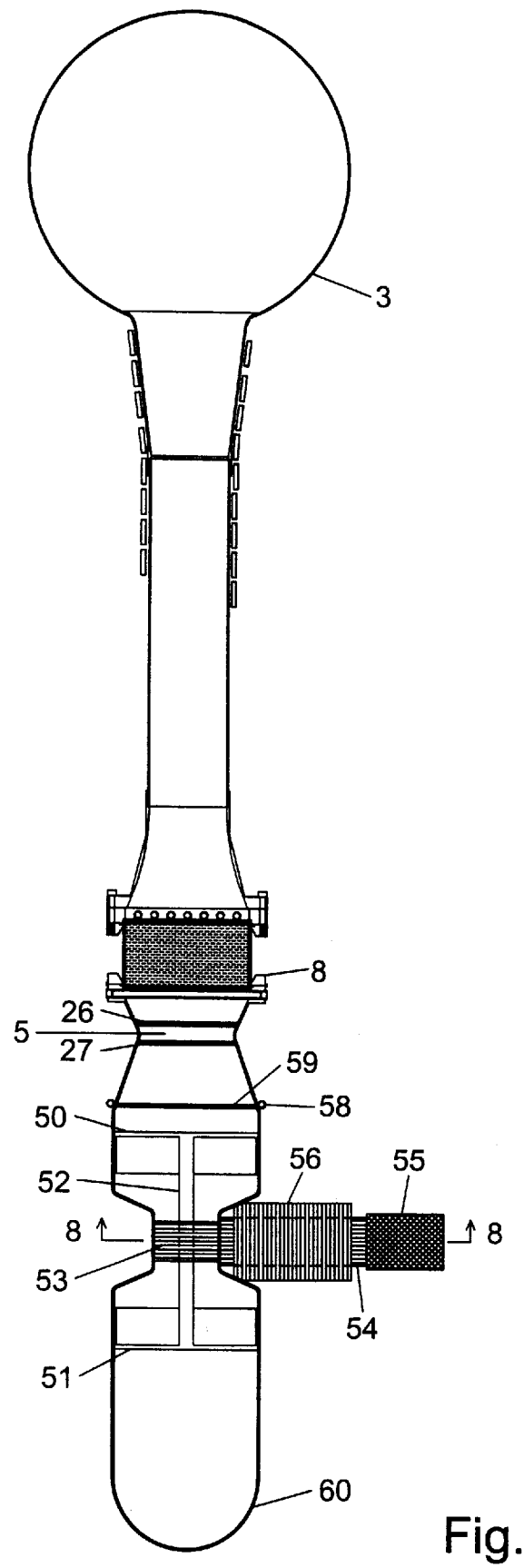
FIG. 7 illustrates a heat driven electricity generator having one driver stack and one moving part in a variable reluctance generator.

The heat driven thermoacoustic motor of this invention can also be used for the purpose of generating electricity. A cross section of the first embodiment of the heat powered generator is shown in FIG. 7. The essence of this acoustic motor-generator is to couple the heat powered acoustic motor from the top half of FIG. 1, to a linear oscillating variable reluctance generator.

The thermoacoustic driver, consisting of stack and exchanger assembly 8 and resonator components, causes acoustic power to flow toward the PAN at location 5. The usual porous disks 26 and 27 are included to reduce the heat leak from the hot heat exchanger. Below the PAN is a linear oscillating piston assembly 49 consisting of two large diameter low-mass pistons 50 and 51 connected together by rod 52 which is also connected to cylindrical plug 53. The material used for items 50, 51 and 52 could be aluminum. Cylindrical plug 53 is made of a high permeability magnetic material such as laminated iron sheets or ferrite ceramic. Cylindrical plug 53 is part of a magnetic circuit formed by permanent magnet 55 and magnetic core 54. The permanent magnet is a ceramic magnet or rare earth magnet, and the high permeability core is laminated iron. Cooling water flowing in tube 58 is coupled thermally to thermally conductive porous disk 59. Disk 59 is a low heat power exchanger with low gas flow impedance. The object of disk 59 and cooling tube 58 is to prevent the generator piston assembly and magnetic components from becoming too hot.

Figure 8:
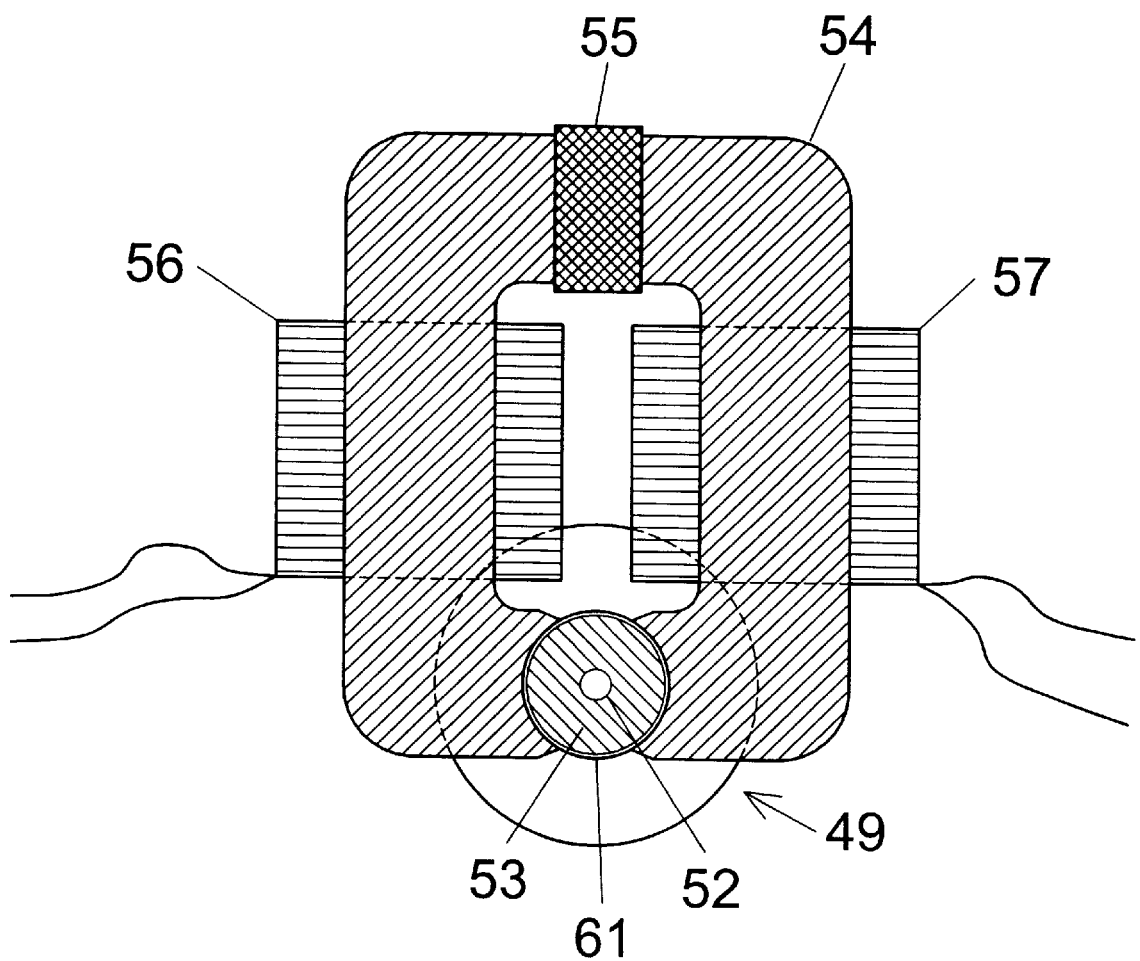
FIG. 8 is a sectional view B-B' taken from FIG. 7. The magnetic components and coils are shown in more detail.

Section B-B' of the FIG. 7 is shown in FIG. 8 and shows the magnetic circuit in more detail. Cylindrical plug 53 moves into and out-of the plane of FIG. 8 either interrupting the magnetic circuit of 54 and 55, or completing the circuit in the middle position. If the plug completes the circuit, the field in core 54 is high, and if the circuit is interrupted, the field in core 54 is low. Conducting coils 56 and 57 will generate a current in response to the varying magnetic flux in core 54. While the direction of the flux in core 54 does not change, the flux magnitude does oscillate greatly. Since the magnetic circuit is interrupted twice for each cycle of motion, the electrical frequency is twice the frequency of motion for plug 53.

The clearance between pistons 50 and 51 and their respective bores is sufficiently small such that the gas blow-by is negligible or modest at the acoustic frequencies. The clearance around pistons 50 and 51 is either maintained by the air-bearing effect of the gas blow-by, or by a flexible suspension not shown. The clearance between plug 53 and its bore need not block gas flow, but should be small enough to effectively complete the magnetic circuit. Also, the cylinder 61 surrounding plug 53 should either be thin enough to not interrupt the magnetic circuit, or it should have enough magnetic permeability to not interrupt the circuit.

Below the bottom of the piston assembly in FIG. 7 is a small volume 60. Volume 60 terminates and seals the pressurized vessel and together with piston 51 forms a gas compliance having a modest stiffness. The moving piston assembly has a mass and experiences a restoring force stiffness arising from several sources. The contributions to the restoring force stiffness are from: the gas stiffness of volume 60 acting on piston 51, the magnetic force between 53 and 54, the acoustic stiffness representing the reactive part of the standing wave acting on piston 50, and any additional explicit spring or suspension (not shown) used to align the piston assembly. The mechanical reactance of all of these stiffness values should exactly cancel the reactance of the moving mass at the operating frequency. With the reactances being canceled, the resistive component of the standing wave acting on piston 50 then supplies the force required to power the magnetic forces in the generator. The object of pistons 50 and 51 having a large diameter and iron plug 53 having a small diameter, is to maintain a reasonably high operating frequency. The larger piston areas for 50 and 51 increase the effective acoustic stiffness on the assembly, and smaller sizes for plug 53 reduce mass. If the operating frequency is allowed to drop too low, then the length of the resonator vessel above stack and exchanger assembly 8 will become excessively large.

FIG. 9 shows another embodiment of the heat powered electricity generator. Gas volumes 3 and 60 of FIG. 7 have been eliminated and two stack and exchanger assemblies are combined with one variable reluctance generator. Compactness and power density of the entire unit is improved as is efficiency, though construction costs are increased.

The resonator vessel 70 of FIG. 9 is similar to the toroidal vessel of FIG. 4. The standing wave is oriented in the resonator such that PAN's exist at locations 71 and 72 with a VAN located at 73. Thus the region of the vessel from 71 to 72 including 73 contains exactly one half of one wavelength. This means that region from 71 to 72 including the variable reluctance piston assembly appears to be effectively one half of one wavelength also. This is consistent with the piston assembly having a net mechanical reactance that is mass-like at the operating frequency, and represents an effective impedance change that is equivalent to 35% to 40% of a wavelength.

Finally, the electricity generator of FIGS. 7, 8 and 9 need not be a variable reluctance generator. Any electricity generating scheme incorporating a linear oscillating piston is possible. A good example is the moving magnet arrangement patented by Sun Power Corp., (Redlich, U.S. Pat. No. '174 (above)). The moving magnet generator has better power density, but the magnetic core arrangement is more complicated and expensive.

Obviously many modifications and variations of the present invention are possible in light of the above teachings. It is, therefore, to be understood that the present invention may be practiced within the scope of the following claims other than as specifically described.

What is claimed is:

1. A heat driven thermoacoustic motor coupled to a thermoacoustic refrigerator comprising:

an elongated acoustic resonator vessel having first and second sides, first and second ends, an interior and exterior, and a pressurized gas contained therein;

said resonator vessel having half of one acoustical wavelength with a pressure antinode contained therein and located approximately in the middle of said vessel length;

said heat driven thermoacoustic motor utilizes the portion of the vessel on the first side of the pressure antinode;

said thermoacoustic refrigerator utilizes the portion of the vessel on the second side of the pressure antinode;

said heat driven thermoacoustic motor having a large bulbous volume located at the first end of the resonator vessel and coupled to one end of a small diameter tube whose opposite end is smoothly coupled to a larger diameter tube, wherein said larger diameter tube having a thermoacoustic motor stack with first and second ends, and wherein said larger diameter tube also having a heat exchanger located adjacent to each of the first and second ends of said motor stack, with the second end of the motor stack and the second heat exchanger being located closest to the acoustic pressure antinode;

wherein said second motor heat exchanger delivers high temperature heat to said second end of the motor stack, and said first heat exchanger removes ambient temperature heat from said first end of motor stack, resulting in the production of acoustic power;

said thermoacoustic refrigerator comprised of a large bulbous volume located at said second end of the resonator vessel and coupled to one end of a small diameter tube whose opposite end is smoothly coupled to a larger diameter tube, wherein said larger diameter tube having a thermoacoustic refrigerator stack with first and second ends, and wherein said larger diameter tube also having a heat exchanger located adjacent to each of first and second ends of said refrigerator stack, with the second end of the refrigerator stack and the second heat exchanger being located closest to the acoustic pressure antinode;

wherein said second refrigerator heat exchanger removes ambient temperature heat from said second end of the refrigerator stack, and said first heat exchanger delivers cold temperature heat to said first end of the refrigerator stack, resulting in refrigeration at a cold temperature;

said resonator vessel couples the thermoacoustic motor and the thermoacoustic refrigerator together via a short reducer tube, wherein the second motor heat exchanger is coupled to the second refrigerator heat exchanger at different tube diameters, with the acoustic pressure antinode contained within the tube reducer, and with the tube reducer carrying acoustic power from the second heat exchanger of the thermoacoustic motor to the second heat exchanger of the thermoacoustic refrigerator; and wherein the position of the acoustic pressure antinode within the resonator vessel can be adjusted by means of a controllable heat source externally applied to the small diameter tube of the thermoacoustic motor in the region near the large bulbous volume.

2. The heat driven thermoacoustic motor and thermoacoustic refrigerator combination of claim 1, wherein the motor stack and the refrigerator stack are comprised of a stack of porous disks wherein each disk consists of wire mesh material.

3. The heat driven thermoacoustic motor and thermoacoustic refrigerator combination of claim 1, wherein said short reducer tube containing the acoustic pressure antinode also contains two porous disks covering the bore of the tube, one on either side of the pressure antinode, for the purpose of suppressing convection and concomitant heat leak from the high temperature heat exchanger, while allowing transmission of the acoustic wave.

4. The heat driven thermoacoustic motor and thermoacoustic refrigerator combination of claim 1, wherein all four heat exchangers are fabricated from spiral wound metal ribbon bonded to radial metal ribs or fingers;

wherein said metal ribs are bonded to a series of parallel metal tubes or to a series of radial metal tubes with each tube bonded directly on top of each metal rib;

wherein all heat exchanger metal has high thermal conductivity;

wherein the metal tubes may contain flowing water or anti-freeze solution, or heat pipe components, or thermal siphon components, or electrical heater cartridges.

5. The heat driven thermoacoustic motor and thermoacoustic refrigerator combination of claim 1, wherein the resonator vessel having in place of the bulbous volumes at each end a larger cylindrical pressure vessel container with sealed ends;

wherein the larger cylindrical vessel is internally sealed into three portions, with the two end volumes providing a folded version of the bulbous volumes of claim 1 and coupled to the acoustically active internal space thus forming one contiguous gas volume, and with the central volume being acoustically inactive but providing thermal insulation between the heat exchangers and the outside; and wherein the internal resonator walls sustain high temperatures in places, but no large pressure differences, and the external vessel walls sustain large pressure differences but no high temperatures.

6. A pair of heat driven thermoacoustic motors coupled to a pair of thermoacoustic refrigerators comprised of two engine units of claim 1, with the four large bulbous volumes and small diameter tubes being replaced by two U-tubes, forming a resonator vessel with toroidal topology;

wherein the acoustic path length of each U-tube is approximately equal to the combined acoustic path length of the two separate small diameter tubes replaced;

wherein the effective acoustic path length of the toroidal vessel is exactly one wavelength; and wherein the externally controllable heat source is applied to the middle region of the thermoacoustic motors' U-tube.

* * * * *